Figure 1:
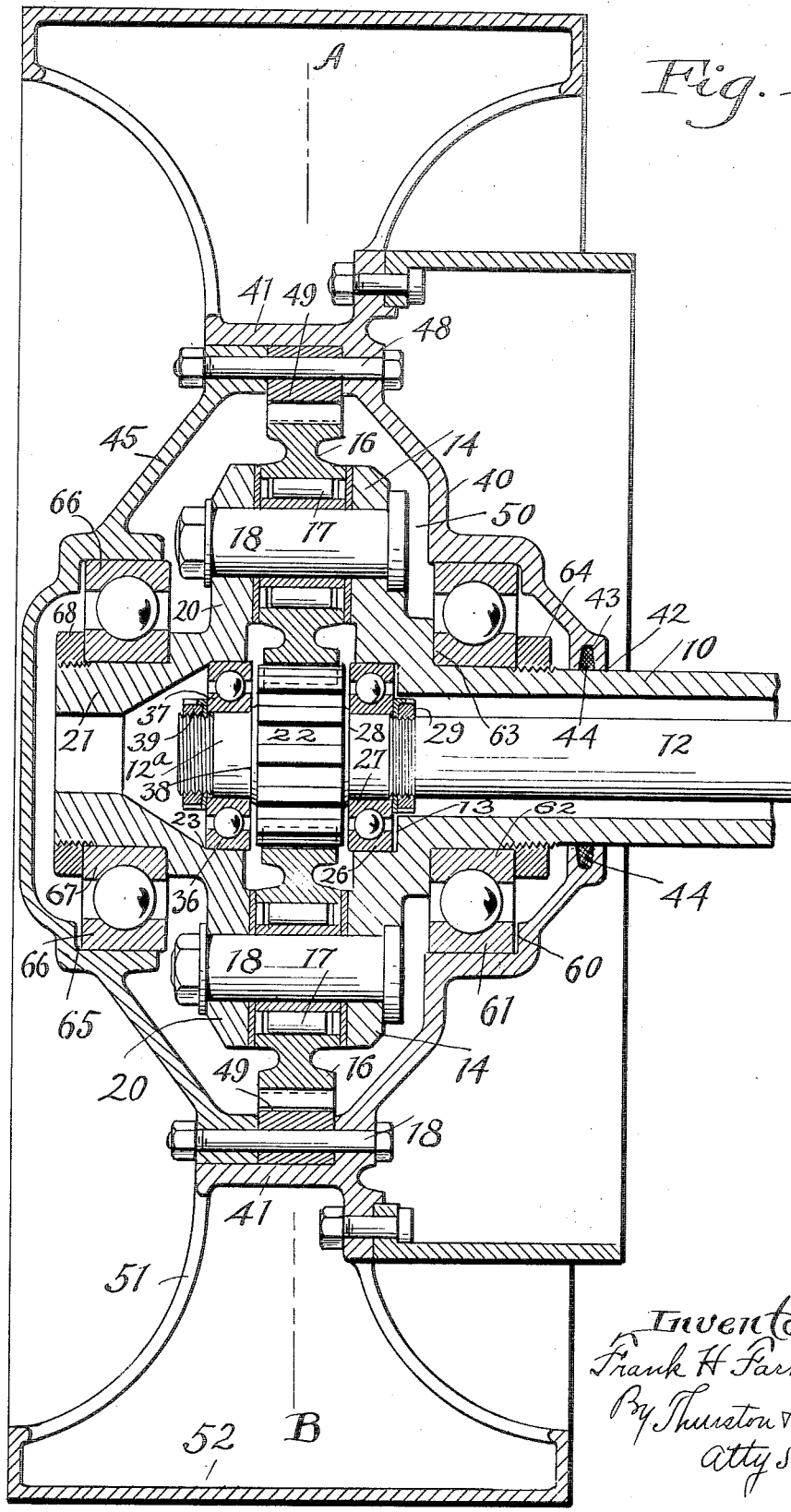

F. H. FARMER.
AUTOMOBILE TRACTION MECHANISM.
APPLICATION FILED JUNE 11, 1917.
1,305,531.
Patented June 3, 1919.
2 SHEETS—SHEET 2.
Fig. 2.
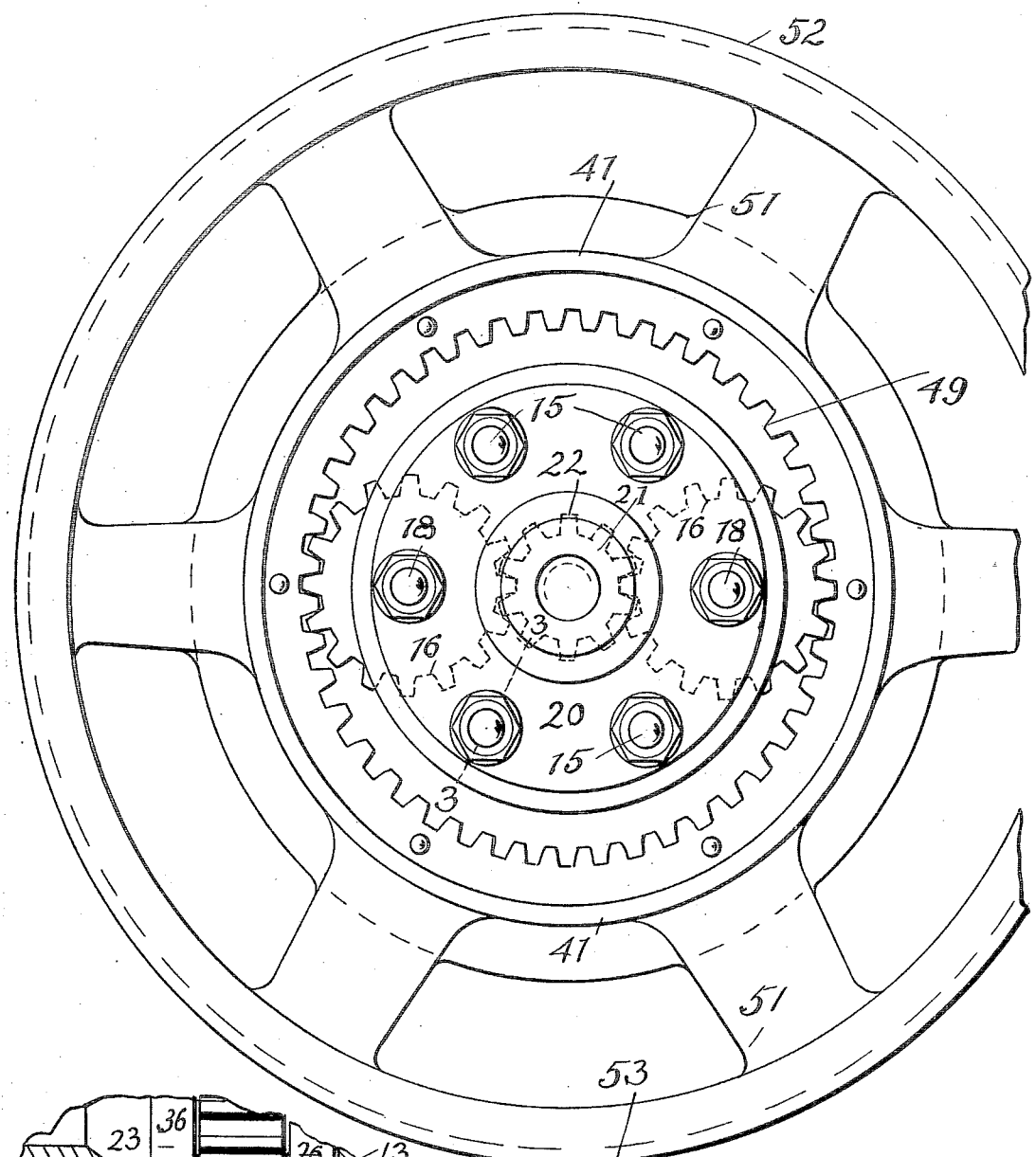
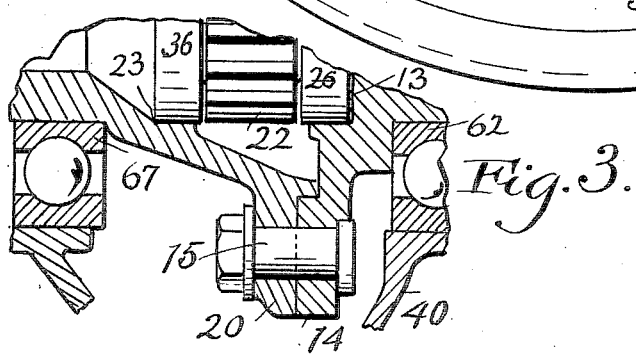
Fig. 3.
Inventor:
Frank H. Farmer
By Thurston & Rives
attys

UNITED STATES PATENT OFFICE.

FRANK H. FARMER, OF CLEVELAND, OHIO, ASSIGNOR TO THE WHITE MOTOR COMPANY, OF CLEVELAND, OHIO, A CORPORATION OF OHIO.

AUTOMOBILE TRACTION MECHANISM.

1,305,531. Specification of Letters Patent. Patented June 3, 1919.

Application filed June 11, 1917. Serial No. 173,975.

*To all whom it may concern:*

Be it known that I, FRANK H. FARMER, a citizen of the United States, residing at Cleveland, in the county of Cuyahoga and State of Ohio, have invented a certain new and useful Improvement in Automobile Traction Mechanism, of which the following is a full, clear, and exact description.

This invention relates to traction wheels for motor trucks, and to geared driving mechanism therefor. The object of the invention is to so combine and arrange these parts that, for their weight, and in comparison with previously known constructions, they will be better capable of resisting and remaining operative under the numerous stresses to which they will be subjected in practical use. Or, to otherwise state, the purpose is to produce such a wheel and driving mechanism as will be cheaper, stronger and more durable than the constructions of similar weight, which have heretofore been used for like purposes.

In the drawing, Figure 1 is a central horizontal section through one end of the driving axle of a motor truck and the traction wheel and driving gearing therefor which constitutes the present invention. Fig. 2 is an outside view of the wheel when the outer plate of said wheel has been removed and Fig. 3 is a sectional view in the plane indicated by line 3—3 on Fig. 2, showing the construction of the parts of the gear cage adjacent the bolts.

Referring to the parts by reference characters, 10 represents one of the so-called axle tubes of the driving axle of a motor vehicle, and 12 one of the live axles or axle shafts. Although the present invention is concerned entirely with the traction wheels, and the gearing for driving them, it may be well to call attention to the fact that the present invention is designed for location at both ends of a driving axle of conventional form; that is to say, a driving axle which includes a hollow frame member, the outer ends of which are known as axle tubes; and differential gearing mounted within said hollow axle frame member for imparting automatically differentiated motion to two axle shafts which extend in opposite directions toward the two traction wheels to be driven thereby. It may, therefore, be assumed that the axle tube 10 is one end of the hollow axle frame member of a conventional rear axle; and that the axle shaft 12 is to be driven by substantially such conventional differential mechanism as is above referred to, and that mechanism similar to that which the drawing shows is at both ends of such an axle structure.

Rigidly fixed to the outer end of the axle tube is a gear cage. This is made up of an inner plate 14 which is preferably an integral flange on the outer end of the axle tube, an outer plate 20; these two plates being secured together at their margins by bolts 15 and being so shaped at their margin as shown in Fig. 3 that they will maintain their spaced parallel relation. This gear cage supports certain idler gears 16, of which there may be any number, although probably two will best serve the purpose. Each of these idler gears is mounted between the two plates 14 and 20 on anti-friction roller bearings 17, which are in turn supported by bolts 18 that extend between and are supported by the plates 14 and 20.

A pinion 22 is fixed to—preferably constructed integral with—the axle shaft 12 a short distance inside of the outer end 12ª of said axle shaft. This axle shaft is rotatably supported upon this gear cage by anti-friction bearings located on opposite sides of this pinion, so as to hold the pinion in mesh with the idler gears 16.

In the opposed faces of the two plates 14 and 20 are the annular concentric recesses 13 and 23. The outer ring 26 of an annular ring bearing is fitted into the recess 13. The inner ring 27 of this bearing embraces the axle shaft and is secured thereon against a shoulder 28 by a nut 29. The outer ring 36 of the other bearing is fitted into the annular recess 23 in the outer plate 20 while the inner ring 37 of the said bearing is secured upon the end 12ª of the axle shaft against a shoulder 38 by a nut 39.

It will be seen therefore, that this axle shaft has two anti-friction bearings for its outer end; and these are supported by the non-rotating axle tube; that is to say, by the gear cage which is rigidly connected with the axle tube; and these two bearings are on opposite sides of the pinion 22.

The wheel as shown does not have anything which can properly be termed a hub. The central part of the wheel is formed of two oppositely dished plates 40 and 45 arranged with their concave sides facing one another; and these are secured together, adjacent their marginal edges, so as to form a central chamber 50; and this chamber contains the gear cage and the parts which are supported thereby. The inner plate 40 is formed with an annular cylindrical flange 41 at its outer margin, and the periphery of the outer plate fits within this flange, as does also the internal ring gear 49. This gear is disposed between the two plates 40, 45 and the three are fastened together by a series of bolts 48. The outer part of the wheel as shown is formed of a series of hollow spokes 51 that are integral with the flange 41, and an annular rim 53 which is integral with the spokes. These spokes and rim are so disposed that the plane indicated by the dotted line A—B on Fig. 1, which is at right angles to the axis of the wheel and midway between the plates 40 and 45, goes likewise through the spokes and through the rim about midway between the outer and inner edges thereof. The plate 40 is formed with a hole 42 through which the axle tube passes into the chamber 50; and in the inner periphery of this hole is a groove 43 for a washer 44 of felt or other suitable material to form a dust and oil-tight sliding joint between the said plate and the axle tube. Two cylindrical sleeves 60 and 65 are formed in the opposed inside faces of the two plates 40 and 45; and these are concentric with the wheel. These sleeves respectively receive and support the outer rings of two anti-friction bearings, by means of which the wheel is rotatably supported. The large outside ring 61 fits and is supported within the sleeve 60, while the small inside bearing ring 62 of this particular bearing is fitted upon the axle tube and is held against a shoulder 63 thereon by a nut 64. The other ring bearing for the wheel consists of a large outside ring 66 which fits within and is supported by the sleeve 65, while the small inside ring 67 is fitted upon an outwardly projecting stud 21, which is an integral part of the plate 20, by a nut 68.

It should be observed that the pinion 22 meshes with the idler gears 16, and that these in turn mesh with the ring gear 49 fixed to the wheel. Therefore when the axle shaft 12 is turned, the wheel is necessarily turned although at a much slower rate. It is to be observed also that this train of gears is all centrally placed within the chamber 50 so that the plane A—B above referred to, passes centrally through all these gears and lies midway between the bearings by which the wheel is supported, and also midway between the bearings by which the outer end of the axle 12 is supported.

Having described my invention, I claim:—

1. In automobile traction mechanism, the combination of a nonrotatable axle tube, a gear cage fixed to the outer end of said axle tube, a rotatable axle shaft extending out through said axle tube and into said gear cage, a pinion fixed to said axle shaft within said gear cage, antifriction bearings for supporting said axle shaft, an idler gear mounted in said gear cage in mesh with said pinion, a traction wheel having a centrally disposed chamber formed of two oppositely dished plates one of which is provided with a cylindrical flange at its margin and the other of which is fitted into said flange, an internal ring gear which also fits within said cylindrical flange between the inside and outside dished plates, means to firmly secure together said ring gear and two plates, an anti-friction bearing interposed between the inner dished plate and said axle tube, and a second anti-friction bearing interposed between the outer dished plate and an outwardly extended part of the gear cage.

2. In automobile traction mechanism, the combination of a non-rotatable axle tube, a gear cage fixed to the outer end of said axle tube, a rotatable axle shaft extending out through said axle tube and into said gear cage, a pinion fixed to said axle shaft within said gear cage, anti-friction bearings for supporting said axle shaft, an idler gear mounted in said gear cage in mesh with said pinion, a traction wheel formed with a dished inner wall or plate having at its outer margin an annular cylindrical flange, and outside of that the outer portion of the wheel, an oppositely dished outside plate which fits within said cylindrical flange, an internal ring gear which also fits within said cylindrical flange between the inside and outside dished plates, means to firmly secure together said ring gear and two plates, an anti-friction bearing interposed between the inner dished plate and said axle tube, and a second anti-friction bearing interposed between the outer dished plate and an outwardly extended part of the gear cage.

3. In automobile traction mechanism, the combination of a traction wheel composed of two pieces, viz: one piece having a central dished plate, an integral flange at the margin of the plate, and spokes which are integral with said flange, and the other piece of the wheel being a plate which is oppositely dished and which is fitted within the said cylindrical flange, an internal ring gear which is fitted within said cylindrical flange and is clamped between the two dished plates near their marginal edges, an axle tube which passes through a hole in the inner dished plate and into the central chamber between said dished plates, a gear cage fixed to said axle tube within said chamber and having on its outer end an axially disposed cylindrical hub, anti-friction bearings for the two oppositely dished wheel plates which bearings are supported respectively on said axle tube and hub, an axle shaft which projects through said axle tube into said wheel chamber, a pinion fixed to said axle shaft within the gear cage, antifriction bearings for said axle shaft located on opposite sides of said pinion and supported by said gear cage, and an intermediate gear rotatably mounted upon said gear cage and in mesh with said pinion and internal gear ring.

In testimony whereof I hereunto affix my signature.

FRANK H. FARMER.

Witnesses:
H. C. McGoly,
F. H. Stetzel.